United States Patent
Sato

(10) Patent No.: US 9,400,743 B2
(45) Date of Patent: Jul. 26, 2016

(54) ELECTRONIC CONTROL APPARATUS AND DATA REWRITING SYSTEM

(71) Applicant: KEIHIN CORPORATION, Tokyo (JP)

(72) Inventor: Hiroshi Sato, Utsunomiya (JP)

(73) Assignee: KEIHIN CORPORATION, Tokyo (JP)

( * ) Notice: Subject to any disclaimer, the term of this patent is extended or adjusted under 35 U.S.C. 154(b) by 176 days.

(21) Appl. No.: 13/922,774

(22) Filed: Jun. 20, 2013

(65) Prior Publication Data

US 2014/0013037 A1    Jan. 9, 2014

(30) Foreign Application Priority Data

Jul. 6, 2012    (JP) .................. 2012-152911

(51) Int. Cl.
*G06F 12/02*    (2006.01)
*G06F 15/16*    (2006.01)

(52) U.S. Cl.
CPC ........ *G06F 12/0246* (2013.01); *G06F 12/0284* (2013.01); *G06F 15/161* (2013.01)

(58) Field of Classification Search
CPC   G06F 12/0246; G06F 12/0284; G06F 15/161
USPC .................................. 711/103, 170
See application file for complete search history.

(56) References Cited

U.S. PATENT DOCUMENTS

| | | | | |
|---|---|---|---|---|
| 5,546,557 A * | 8/1996 | Allen | .................... | G06F 3/0601 711/111 |
| 5,933,595 A * | 8/1999 | Iizuka | ....................... | G06F 8/65 711/155 |
| 6,046,937 A * | 4/2000 | Komori et al. | ........... | 365/185.04 |
| 6,480,928 B2 * | 11/2002 | Yashiki et al. | ................. | 711/103 |
| 6,598,114 B2 * | 7/2003 | Funakoshi | ........... | G11C 16/102 711/170 |
| 2002/0029313 A1 * | 3/2002 | Funakoshi | ..................... | 711/102 |
| 2003/0236947 A1 * | 12/2003 | Yamazaki | ............. | G06F 12/084 711/128 |
| 2008/0320331 A1 * | 12/2008 | Nakatani et al. | ................. | 714/35 |
| 2012/0151158 A1 * | 6/2012 | Yeh | .............................. | 711/154 |
| 2013/0212571 A1 * | 8/2013 | Matsuura | .................. | G06F 8/65 717/170 |

(Continued)

FOREIGN PATENT DOCUMENTS

| EP | 001542181 A1 * | 6/2005 | ............. G06F 12/14 |
|---|---|---|---|
| JP | H09160766 A | 6/1997 | |

(Continued)

OTHER PUBLICATIONS

Japanese Notice of Allowance corresponding to Application No. 2012-152911; Mailing Date: Dec. 18, 2015, with English translation.

*Primary Examiner* — Pierre-Michel Bataille
(74) *Attorney, Agent, or Firm* — Cantor Colburn LLP

(57) ABSTRACT

An electronic control apparatus includes: a plurality of processing devices each having a rewritable non-volatile memory and each executing a predetermined process in accordance with stored data that is stored in the non-volatile memory, wherein one of the processing devices extracts, from rewriting data transmitted from an external rewriting apparatus and including a plurality of individual rewriting data each corresponding to one of a plurality of dedicated address ranges, one of the individual rewriting data which corresponds to one of the dedicated address ranges that is individually allocated in advance for the one of the processing devices, and rewrites the stored data that is stored in the non-volatile memory of the one of the processing devices by using the one of the individual rewriting data.

4 Claims, 4 Drawing Sheets

(56) References Cited

U.S. PATENT DOCUMENTS

2013/0290585 A1* 10/2013 Marietta ................ G06F 13/14
                                                      710/240
2014/0244919 A1* 8/2014 Chicher ........................ 711/103

FOREIGN PATENT DOCUMENTS

| JP | 2004-310221 A | 11/2004 |
| JP | 2006221274 A | 8/2006 |
| JP | 2009175947 A | 8/2009 |

* cited by examiner

ELECTRONIC CONTROL APPARATUS AND DATA REWRITING SYSTEM

Priority is claimed on Japanese Patent Application No. 2012-152911, filed on Jul. 6, 2012, the contents of which are incorporated herein by reference.

BACKGROUND OF THE INVENTION

1. Field of the Invention

The present invention relates to an electronic control apparatus and a data rewriting system.

2. Description of Related Art

In the related art, a technology is known that enables a control program or control data that is stored in a rewritable non-volatile memory such as a flash memory or EEPROM (Electrically Erasable and Programmable Read Only Memory) which are embedded in an electronic control apparatus for controlling a vehicle, to be rewritten by using a dedicated rewriting apparatus after shipping the electronic control apparatus to the market.

In Japanese Unexamined Patent Application Publication No. 2004-310221, a technology is disclosed in which ID (Identification) information for identifying all microcomputers is stored in advance in a non-volatile memory embedded in a representative microcomputer of a plurality of microcomputers installed in an electronic control apparatus, and this representative microcomputer transmits the ID information of a microcomputer that is a target of which data is rewritten, to an external tool in accordance with a request from the external tool (memory rewriting apparatus).

The external tool recognizes the microcomputer that is the target of rewriting based on the ID information received from the electronic control apparatus, adds the ID information of the microcomputer to rewriting data, and transmits the rewriting data to the electronic control apparatus. Each of the microcomputers in the electronic control apparatus performs rewriting of a control program or control data that is stored in the non-volatile memory, by using the rewriting data with the ID information directed to each of the microcomputers.

SUMMARY OF THE INVENTION

According to the law established by the California Air Resource Board of the United States of America, effective for a 2010-year model vehicle and later, it is mandatory to use a consistently single CID (Calibration ID) with respect to an electronic control apparatus for controlling a power train. In this respect, the related art above requires allocating a specific ID for each of a plurality of microcomputers installed in a single electronic control apparatus, and therefore may not accommodate the requirement of the law that obligates to manage a single electronic control apparatus with a single ID as described above.

In view of the foregoing, an object of aspects of the present invention is to provide an electronic control apparatus and a data rewriting system that are capable of easily and reliably rewriting data in each of a plurality of processing devices without performing ID management of a plurality of the processing devices installed in an electronic control apparatus.

In order to achieve the above object, an electronic control apparatus and data rewriting system according to aspects of the present invention adopt one of the configurations described below.

(1) An electronic control apparatus according to an aspect of the present invention includes: a plurality of processing devices that have a rewritable non-volatile memory and that execute a predetermined process in accordance with stored data that is stored in the non-volatile memory, wherein each of the processing devices extracts individual rewriting data included within a dedicated address range that is individually allocated in advance for each of the processing devices, out of rewriting data transmitted from an external rewriting apparatus, and rewrites the stored data that is stored in the non-volatile memory of each of the processing devices by using the individual rewriting data.

(2) In the aspect of (1) described above, each of the processing devices may extract common rewriting data included within a shared address range that is common to the plurality of the processing devices, in addition to the individual rewriting data, out of the rewriting data transmitted from the rewriting apparatus, and may rewrite the stored data that is stored in the non-volatile memory of each of the processing devices by using the individual rewriting data and the common rewriting data.

(3) In the aspect of (1) or (2) described above, the plurality of the processing devices may be connected in a daisy chain configuration, and when rewriting the stored data, a foremost processing device of the plurality of the processing devices connected in the daisy chain configuration may be connected so as to be capable of communicating to the rewriting apparatus.

(4) A data rewriting system according to an other aspect of the present invention includes: an electronic control apparatus that is provided with a plurality of processing devices that have a rewritable non-volatile memory and that execute a predetermined process in accordance with stored data that is stored in the non-volatile memory; and a rewriting apparatus that transmits rewriting data that is used for rewriting of the stored data to the electronic control apparatus, wherein the rewriting apparatus transmits the rewriting data including individual rewriting data within a dedicated address range that is individually allocated in advance for each of the processing devices, to the electronic control apparatus, and wherein each of the processing devices in the electronic control apparatus extracts the individual rewriting data included within the dedicated address range that is individually allocated in advance for each of the processing devices, out of the rewriting data transmitted from the rewriting apparatus, and rewrites the stored data that is stored in the non-volatile memory of each of the processing devices by using the individual rewriting data.

(5) In the aspect of (4) described above, the rewriting apparatus may transmit the rewriting data including common rewriting data within a shared address range that is common to the plurality of the processing devices, in addition to the individual rewriting data, to the electronic control apparatus, and each of the processing devices in the electronic control apparatus may extract the common rewriting data included within the shared address range that is common to the plurality of the processing devices, in addition to the individual rewriting data, out of the rewriting data transmitted from the rewriting apparatus, and may rewrite the stored data that is stored in the non-volatile memory of each of the processing devices by using the individual rewriting data and the common rewriting data.

(6) In the aspect of (4) or (5) described above, the plurality of the processing devices in the electronic control apparatus may be connected in a daisy chain configuration, and when rewriting the stored data, a foremost processing device of the plurality of the processing devices connected in the daisy chain configuration may be connected so as to be capable of communicating to the rewriting apparatus.

According to the aspects of the present invention, each of a plurality of the processing devices installed in the electronic control apparatus extracts the individual rewriting data included within the dedicated address range that is individually allocated in advance for each of the processing devices, out of the rewriting data transmitted from the rewriting apparatus, and rewrites the stored data that is stored in the non-volatile memory of each of the processing devices by using the individual rewriting data, which makes it possible to easily and reliably perform rewriting of the data in each of a plurality of the processing devices, without performing ID management of a plurality of the processing devices installed in the electronic control apparatus.

DESCRIPTION OF THE EMBODIMENTS

Hereinafter, an embodiment of the present invention will be described with reference to the drawings.

Figure 1:
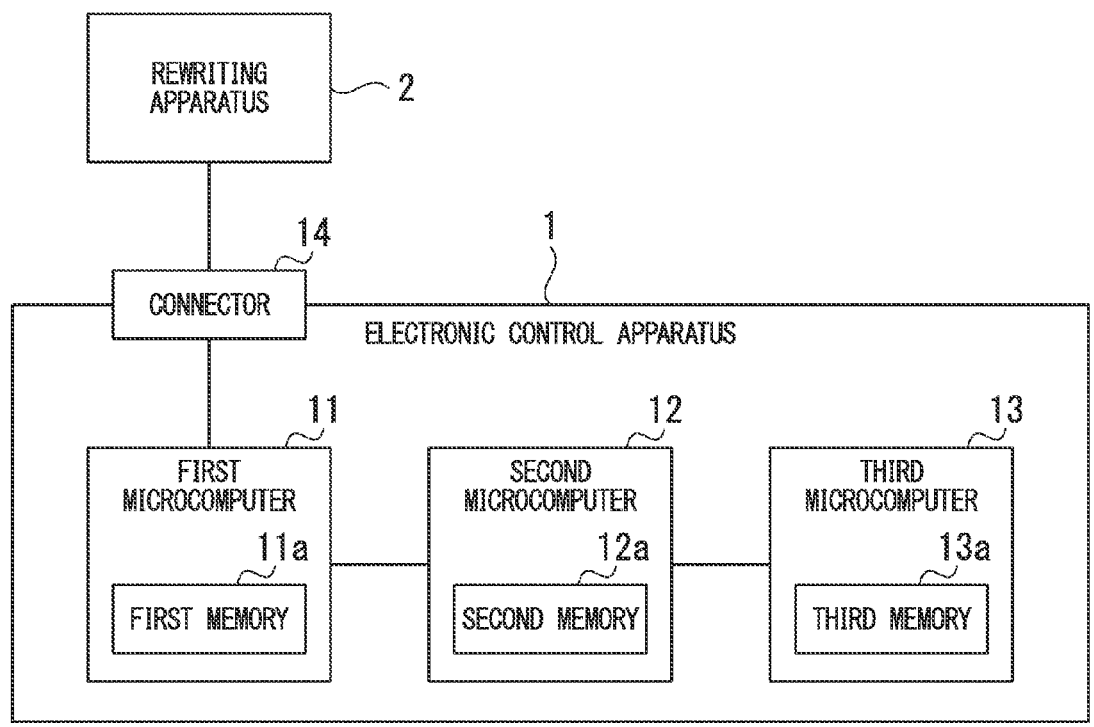
FIG. 1 is a schematic configuration illustration of a data rewriting system according to an embodiment of the present invention.

FIG. 1 is a schematic configuration illustration of a data rewriting system according to the embodiment of the present invention. This data rewriting system includes, for example, an electronic control apparatus 1 for controlling a vehicle, and a rewriting apparatus 2 that transmits rewriting data that is used for rewriting of data in the electronic control apparatus 1, to the electronic control apparatus 1. In this embodiment, "data" represents a concept that includes all types of data, such as a control program or control data (a control parameter), that is required for causing a processing device (microcomputer described later) installed in the electronic control apparatus 1 to execute a predetermined process.

The electronic control apparatus 1 includes a rewritable non-volatile memory, and is provided with a plurality of processing devices that execute a predetermined process in accordance with stored data that is stored in this non-volatile memory. The electronic control apparatus 1 according to this embodiment includes three microcomputers (a first microcomputer 11, a second microcomputer 12, and a third microcomputer 13) as the above processing device.

The first microcomputer 11 includes a first memory 11a that is a rewritable non-volatile memory, for example, such as a flush memory or an EEPROM. The first microcomputer 11 is, for example, a microcomputer for controlling a hybrid system that executes a process required for controlling the driving of an in-vehicle motor and controlling the charge and the discharge of an in-vehicle battery, in accordance with stored data that is stored in the first memory 11a.

The second microcomputer 12 includes a second memory 12a that is a rewritable non-volatile memory, for example, such as a flush memory or an EEPROM. The second microcomputer 12 is, for example, a microcomputer for monitoring that executes a process required for monitoring the operation of the first microcomputer 11, in accordance with stored data that is stored in the second memory 12a.

The third microcomputer 13 includes a third memory 13a that is a rewritable non-volatile memory, for example, such as a flush memory or an EEPROM. The third microcomputer 13 is, for example, a microcomputer for controlling an engine that executes a process required for controlling the engine in cooperation with the first microcomputer 11, in accordance with stored data that is stored in the third memory 13a.

The first microcomputer 11, the second microcomputer 12, and the third microcomputer 13 are connected in a daisy chain configuration in which the first microcomputer 11 is positioned at a foremost part, the second microcomputer 12 is positioned at a second part, and the third microcomputer 13 is positioned at a rearmost part. As shown in FIG. 1, when rewriting the data, the first microcomputer 11, the second microcomputer 12, and the third microcomputer 13 are connected such that the first microcomputer 11 at the foremost part is capable of communicating with the rewriting apparatus 2 via a connector 14.

Figure 2:
FIG. 2A is an example of a data structure of a rewriting data transmitted from a rewriting apparatus 2 to an electronic control apparatus 1 in the data rewriting system according to the embodiment of the present invention.
FIG. 2B is a modified example of the data structure of the rewriting data transmitted from the rewriting apparatus 2 to the electronic control apparatus 1 in the data rewriting system according to the embodiment of the present invention.

The rewriting apparatus 2 has a function that transmits the rewriting data including individual rewriting data within an address range (a dedicated address range) that is individually allocated in advance for each of the first microcomputer 11, the second microcomputer 12, and the third microcomputer 13, to the electronic control apparatus 1 when rewriting the data in the electronic control apparatus 1. FIG. 2A shows an example of a data structure of the rewriting data transmitted to the electronic control apparatus 1 from the rewriting apparatus 2.

As shown in FIG. 2A, the rewriting data transmitted to the electronic control apparatus 1 from the rewriting apparatus 2 is, for example, 8-bit data set at the addresses from No. 0 (0×00 in hexadecimal notation) to No. 255 (0×FF in hexadecimal notation) (namely, data with a total data amount of 256×8=2048 bits).

In the above rewriting data, as shown in FIG. 2A, an address range from No. 0 (0×00 in hexadecimal notation) to No. 79 (0×4F in hexadecimal notation) is allocated for the first microcomputer 11. Within this address range, individual rewriting data used for rewriting of the data in the first memory 11a (hereinafter, referred to as rewriting data for the first microcomputer) is included.

In addition, as shown in FIG. 2A, an address range from No. 96 (0×60 in hexadecimal notation) to No. 175 (0×AF in hexadecimal notation) in the rewriting data is allocated for the second microcomputer 12. Within this address range, individual rewriting data used for rewriting of the data in the second memory 12a (hereinafter, referred to as rewriting data for the second microcomputer) is included.

In addition, as shown in FIG. 2A, an address range from No. 176 (0×B0 in hexadecimal notation) to No. 255 (0×FF in hexadecimal notation) in the rewriting data is allocated for the third microcomputer 13. Within this address range, individual rewriting data used for rewriting of the data in the third memory 13a (hereinafter, referred to as rewriting data for the third microcomputer) is included.

In addition, within an address range from No. 80 (0×50 in hexadecimal notation) to No. 95 (0×5F in hexadecimal notation) in the above rewriting data, null data (for example, a set of "0") is included.

Each of the first microcomputer 11, the second microcomputer 12, and the third microcomputer 13 in the electronic control apparatus 1 has a function that extracts the individual rewriting data included within the address range that is allocated in advance for each of the first microcomputer 11, the second microcomputer 12, and the third microcomputer 13 (any one of the rewriting data for the first microcomputer, the rewriting data for the second microcomputer, and the rewriting data for the third microcomputer), out of the above rewriting data, and by using the extracted individual rewriting data, rewrites the stored data that is stored in the non-volatile memory of each of the first microcomputer 11, the second microcomputer 12, and the third microcomputer 13 (any one of the first memory 11*a*, the second memory 12*a*, and the third memory 13*a*).

Hereinafter, an operation of the data rewriting system configured as above will be explained.

Figure 3:
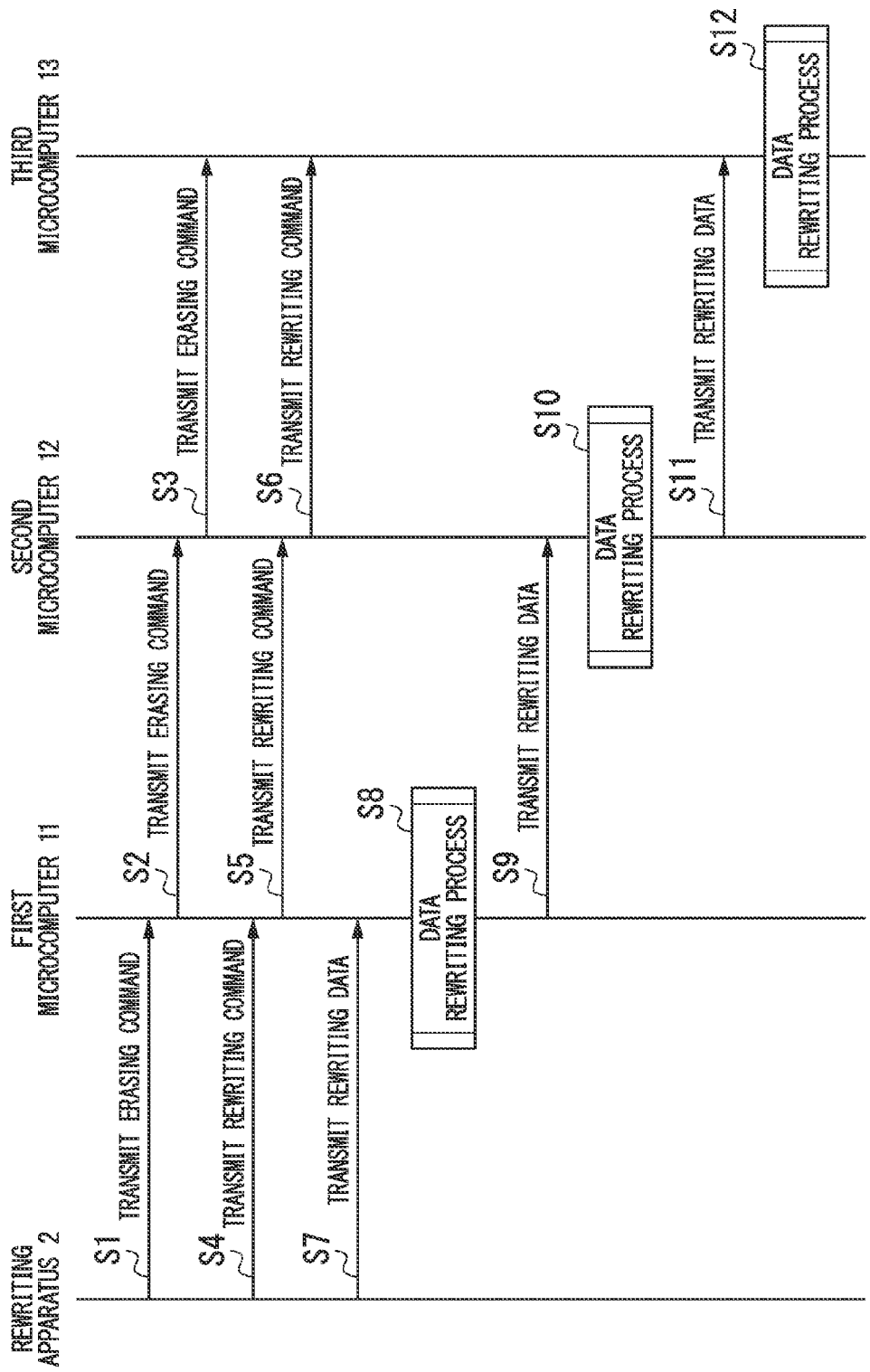
FIG. 3 is a sequence chart that shows a communication sequence of a rewriting apparatus 2, a first microcomputer 11, a second microcomputer 12, and a third microcomputer 13.

FIG. 3 is a sequence chart that shows a communication sequence of the rewriting apparatus 2, the first microcomputer 11, the second microcomputer 12, and the third microcomputer 13.

As shown in FIG. 3, the rewriting apparatus 2 first transmits an erasing command (a command that commands to erase data) to the first microcomputer 11 when rewriting the data in the electronic control apparatus 1 (step S1). This erasing command is transmitted to the second microcomputer 12 from the first microcomputer 11 (step S2). The erasing command is further transmitted to the third microcomputer 13 from the second microcomputer 12 (step S3).

Next, the rewriting apparatus 2 transmits a rewriting command (a command that commands to rewrite data) to the first microcomputer 11 (step S4). This rewriting command is transmitted to the second microcomputer 12 from the first microcomputer 11 (step S5). The rewriting command is further transmitted to the third microcomputer 13 from the second microcomputer 12 (step S6).

Next, the rewriting apparatus 2 transmits rewriting data having a data structure shown in FIG. 2A to the first microcomputer 11 (step S7). When receiving the rewriting data from the rewriting apparatus 2, the first microcomputer 11 executes a data rewriting process in accordance with a flow chart shown in FIG. 4 (step S8).

Figure 4:
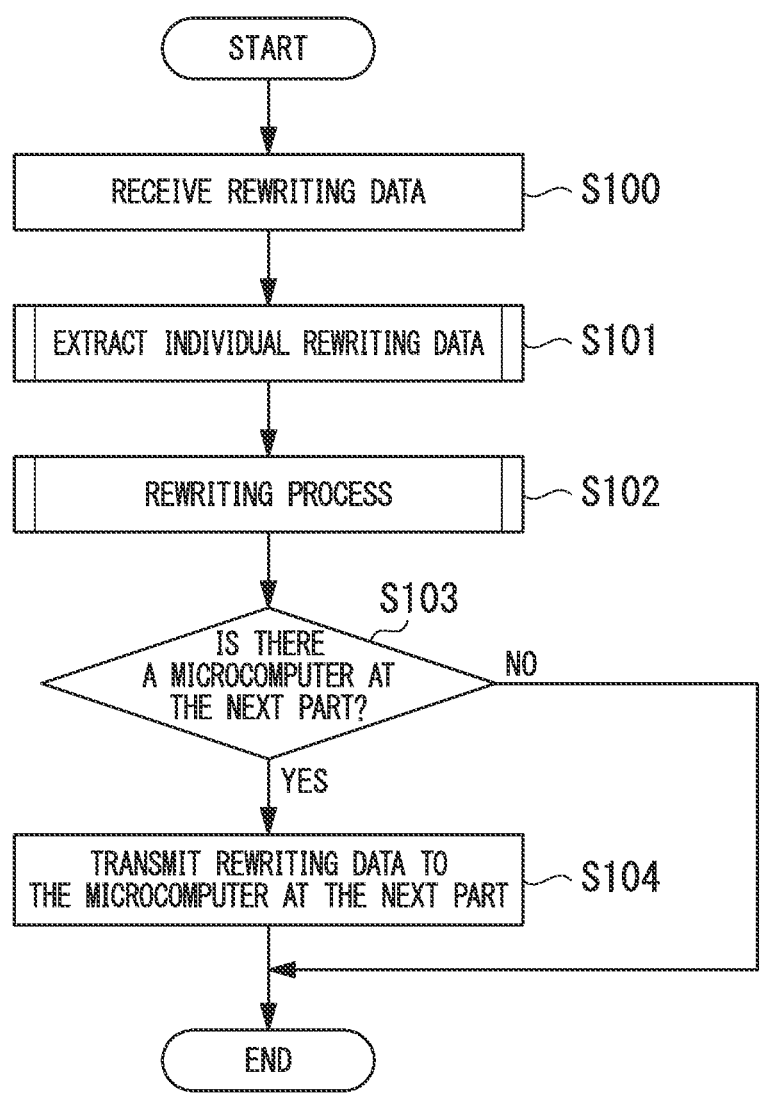
FIG. 4 is a flow chart that shows a data rewriting process that is executed by the first microcomputer 11, the second microcomputer 12, and the third microcomputer 13.

In detail, as shown in FIG. 4, when receiving the rewriting data from the rewriting apparatus 2 (step S100), the first microcomputer 11 extracts individual rewriting data included within the address range (No. 0 to No. 79) that is allocated in advance for the first microcomputer 11 (rewriting data for the first microcomputer), out of this received rewriting data (step S101).

Then, the first microcomputer 11 rewrites the stored data that is stored in the non-volatile memory of the first microcomputer 11 (the first memory 11*a*) by using the extracted rewriting data for the first microcomputer (step S102).

Then, the first microcomputer 11 determines whether there is a microcomputer connected at the next part or not (step S103), and terminates the data rewriting process in case of "No". On the other hand, in case of "Yes", the first microcomputer 11 transmits the rewriting data received from the rewriting apparatus 2 to the microcomputer at the next part (namely, the second microcomputer 12) (step S104).

The explanation is continued referring back to FIG. 3. The first microcomputer 11 transmits the rewriting data to the second microcomputer 12 at the next part after rewriting of the data in the first memory 11 *a* as described above (step S9). When receiving the rewriting data from the first microcomputer 11, the second microcomputer 12 executes a data rewriting process in accordance with the flow chart shown in FIG. 4, as well as the first microcomputer 11 (step S10).

In other words, the second microcomputer 12 extracts individual rewriting data included within the address range (No. 96 to No. 175) that is allocated in advance for the second microcomputer 12 (rewriting data for the second microcomputer), out of the rewriting data received from the first microcomputer 11. The second microcomputer 12 rewrites the stored data that is stored in the non-volatile memory of the second microcomputer 12 (the second memory 12*a*) by using the extracted rewriting data for the second microcomputer.

Then, the second microcomputer 12 determines whether there is a microcomputer connected at the next part or not. As the third microcomputer 13 is connected at the next part, the second microcomputer 12 transmits the rewriting data received from the first microcomputer 11 to the third microcomputer 13 (step S11). When receiving the rewriting data from the second microcomputer 12, the third microcomputer 13 executes the data rewriting process in accordance with the flow chart shown in FIG. 4 as well as the first microcomputer 11 (step S12).

In other words, the third microcomputer 13 extracts individual rewriting data included within the address range (No. 176 to No. 255) that is allocated in advance for the third microcomputer 13 (rewriting data for the third microcomputer), out of the rewriting data received from the second microcomputer 12. The third microcomputer 13 rewrites the stored data that is stored in the non-volatile memory of the third microcomputer 13 (the third memory 13*a*) by using the extracted rewriting data for the third microcomputer.

Then, the third microcomputer 13 determines whether there is a microcomputer connected at the next part or not. As a microcomputer is not connected at the next part, the third microcomputer 13 terminates the data rewriting process without performing transmission of the rewriting data.

As described above, according to this embodiment, each of a plurality of processing devices installed in the electronic control apparatus 1 (the first microcomputer 11, the second microcomputer 12, and the third microcomputer 13) extracts the individual rewriting data included within the address range that is allocated in advance for each of the processing devices, out of the rewriting data transmitted from the rewriting apparatus 2, and rewrites the stored data that is stored in the non-volatile memory of each of the processing devices by using the individual rewriting data.

Thereby, it becomes possible to easily and reliably perform rewriting of the data in each of a plurality of the processing devices, without performing ID management of a plurality of the processing devices installed in the electronic control apparatus 1.

In addition, the present invention is not limited to the above embodiment, and modified examples can be provided as described below.

(1) In the above embodiment, null data is included within the address range from No. 80 to No. 95 in the rewriting data transmitted to the electronic control apparatus 1 from the rewriting apparatus 2.

Alternatively, as shown in FIG. 2B, common rewriting data that is commonly used for rewriting of the data in the first memory 11*a*, the second memory 12*a*, and the third memory 13*a* may be included within this address range from No. 80 to No. 95. Thereby, it is possible to effectively use the capacity of the rewriting data.

In this case, the rewriting apparatus 2 transmits rewriting data including the common rewriting data within the address range (the address range from No. 80 to No. 95, a shared address range) that is common to the processing devices (the first microcomputer 11, the second microcomputer 12, and the third microcomputer 13) in addition to the individual rewriting data (the rewriting data for the first microcomputer, the rewriting data for the second microcomputer, and the rewriting data for the third microcomputer), to the electronic control apparatus 1.

Each of the first microcomputer 11, the second microcomputer 12, and the third microcomputer 13 extracts the common rewriting data included within the address range that is common to the processing devices in addition to the individual rewriting data described above, out of the rewriting data having a data structure shown in FIG. 2B. Each of the first microcomputer 11, the second microcomputer 12, and the third microcomputer 13 rewrites the stored data that is stored in the non-volatile memory of each of the first microcomputer 11, the second microcomputer 12, and the third microcomputer 13 by using the extracted individual rewriting data and the common rewriting data.

For example, the first microcomputer 11 extracts the rewriting data for the first microcomputer included within the address range from No. 0 to No. 79 and the common rewriting data included within the address range from No. 80 to No. 95, out of the rewriting data having the data structure shown in FIG. 2B. The first microcomputer 11 rewrites the stored data that is stored in the first memory 11a by using the rewriting data for the first microcomputer and the common rewriting data.

In addition, the second microcomputer 12 extracts the rewriting data for the second microcomputer included within the address range from No. 96 to No. 175 and the common rewriting data included within the address range from No. 80 to No. 95, out of the rewriting data having the data structure shown in FIG. 2B. The second microcomputer 12 rewrites the stored data that is stored in the second memory 12a by using the rewriting data for the second microcomputer and the common rewriting data.

In addition, the third microcomputer 13 extracts the rewriting data for the third microcomputer included within the address range from No. 176 to No. 255 and the common rewriting data included within the address range from No. 80 to No. 95, out of the rewriting data having the data structure shown in FIG. 2B. The third microcomputer 13 rewrites the stored data that is stored in the third memory 13a by using the rewriting data for the third microcomputer and the common rewriting data.

(2) In the above embodiment, a case where three processing devices (the first microcomputer 11, the second microcomputer 12, and the third microcomputer 13) are connected in the daisy chain configuration within the electronic control apparatus 1 is exemplified.

However, this is aimed at reducing the cost required for a communication wiring within the electronic control apparatus 1, so it is not necessary to connect the processing devices within the electronic control apparatus 1 in the daisy chain configuration. In addition, the number of the processing devices within the electronic control apparatus 1 is not limited to three.

(3) Although the electronic control apparatus 1 for controlling a vehicle control is exemplified in the above embodiment, the data rewriting system according to the embodiment of the present invention is widely applicable to an electronic control apparatus that includes a plurality of processing devices that have a rewritable non-volatile memory and that execute a predetermined process in accordance with stored data that is stored in this non-volatile memory.

While preferred embodiments of the invention have been described and illustrated above, it should be understood that these are exemplary examples of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An electronic control apparatus comprising:
   a plurality of processing devices each having a rewritable non-volatile memory and each executing a predetermined process in accordance with stored data that is stored in the non-volatile memory, wherein
   a first processing device extracts, from rewriting data transmitted from an external rewriting apparatus and including a plurality of individual rewriting data each corresponding to one of a plurality of dedicated address ranges, first individual rewriting data which corresponds to a first dedicated address range that is individually allocated in advance for the first processing device, and rewrites first stored data that is stored in a first non-volatile memory of the first processing device by using the first individual rewriting data,
   a second processing device extracts, from the rewriting data, second individual rewriting data which corresponds to a second dedicated address range that is different from the first dedicated address range and is individually allocated in advance for the second processing device, and rewrites second stored data that is stored in a second non-volatile memory of the second processing device by using the second individual rewriting data;
   the plurality of the processing devices are connected in a daisy chain configuration, and
   when rewriting the stored data, a foremost processing device of the plurality of the processing devices connected in the daisy chain configuration is connected so as to be capable of communicating to the rewriting apparatus.

2. The electronic control apparatus according to claim 1, wherein
   one of the processing devices extracts, from the rewriting data transmitted from the rewriting apparatus, common rewriting data included within a shared address range that is common to the plurality of the processing devices, in addition to one of the individual rewriting data, and rewrites the stored data that is stored in the non-volatile memory of the one of the processing devices by using the one of the individual rewriting data and the common rewriting data.

3. A data rewriting system comprising:
   an electronic control apparatus that is provided with a plurality of processing devices each having a rewritable non-volatile memory and each executing a predetermined process in accordance with stored data that is stored in the non-volatile memory; and
   a rewriting apparatus that transmits to the electronic control apparatus rewriting data that is used for rewriting of the stored data and includes a plurality of individual rewriting data each corresponding to one of a plurality of dedicated address ranges, wherein
   the rewriting apparatus transmits the rewriting data including the plurality of individual rewriting data each corresponding to one of the dedicated address ranges that is individually allocated in advance for each of the processing devices, to the electronic control apparatus, and
   a first processing device in the electronic control apparatus extracts, from the rewriting data transmitted from the rewriting apparatus, first individual rewriting data which corresponds to a first dedicated address range that is individually allocated in advance for the first processing device, and rewrites first stored data that is stored in a first non-volatile memory of the first processing device by using the first individual rewriting data, a second processing device in the electronic control apparatus extracts, from the rewriting data transmitted from the rewriting apparatus, second individual rewriting data which corresponds to a second dedicated address range that is different from the first dedicated address range and is individually allocated in advance for the second processing device, and rewrites second stored data that is stored in a second non-volatile memory of the second processing device by using the second individual rewriting data;

the plurality of the processing devices in the electronic control apparatus are connected in a daisy chain configuration, and when rewriting the stored data, a foremost processing device of the plurality of the processing devices connected in the daisy chain configuration is connected so as to be capable of communicating to the rewriting apparatus.

4. The data rewriting system according to claim 3, wherein the rewriting apparatus transmits the rewriting data including common rewriting data within a shared address range that is common to the plurality of the processing devices, in addition to the plurality of individual rewriting data, to the electronic control apparatus, and one of the processing devices in the electronic control apparatus extracts, from the rewriting data transmitted from the rewriting apparatus, the common rewriting data included within the shared address range that is common to the plurality of the processing devices, in addition to one of the individual rewriting data, and rewrites the stored data that is stored in the non-volatile memory of the one of the processing devices by using the one of the individual rewriting data and the common rewriting data.

* * * * *